United States Patent
Udelle

Patent Number: 5,628,282
Date of Patent: May 13, 1997

[54] MECHANICALLY ASSISTED ANIMAL SELF-GROOMING DEVICE

[76] Inventor: Steven D. Udelle, 26414 Barranquilla Ave., Punta Gorda, Fla. 33983-5724

[21] Appl. No.: 626,034

[22] Filed: Apr. 1, 1996

Related U.S. Application Data

[63] Continuation-in-part of Ser. No. 348,728, Dec. 2, 1994, Pat. No. 5,540,186.

[51] Int. Cl.$^6$ .................................................. A01K 13/00
[52] U.S. Cl. ........................................... 119/609; 119/706
[58] Field of Search ................................. 119/707, 711, 119/706, 608, 609, 621, 622, 664

[56] References Cited

U.S. PATENT DOCUMENTS

| | | | |
|---|---|---|---|
| 2,721,538 | 10/1955 | Latham | 119/609 |
| 2,865,329 | 12/1958 | Elliott | 119/622 |
| 3,175,537 | 3/1965 | Paul | 119/664 |
| 5,176,105 | 1/1993 | Madden | 119/622 |

*Primary Examiner*—Todd E. Manahan

[57] ABSTRACT

A mechanically assisted animal self-grooming device simulates the brushing movements of a human hand by utilizing a compact, maintenance-free miniature electric motor assembly 22 affixed and concealed to the underside of upper surface 28 of housing assembly 10. The electric motor assembly output shaft 24 is directly coupled to an opening 30 in the bottom of the brush body 12. The brush body 12 is mushroom shaped to accommodate the top and side surface of an animal's body simultaneously. An electrically powered reversing switch 40 permits changing the rotation of the electric motor 48 when desired. An animal can effectively groom its coat by simply pressing any part of its body against the rotating brush.

6 Claims, 1 Drawing Sheet

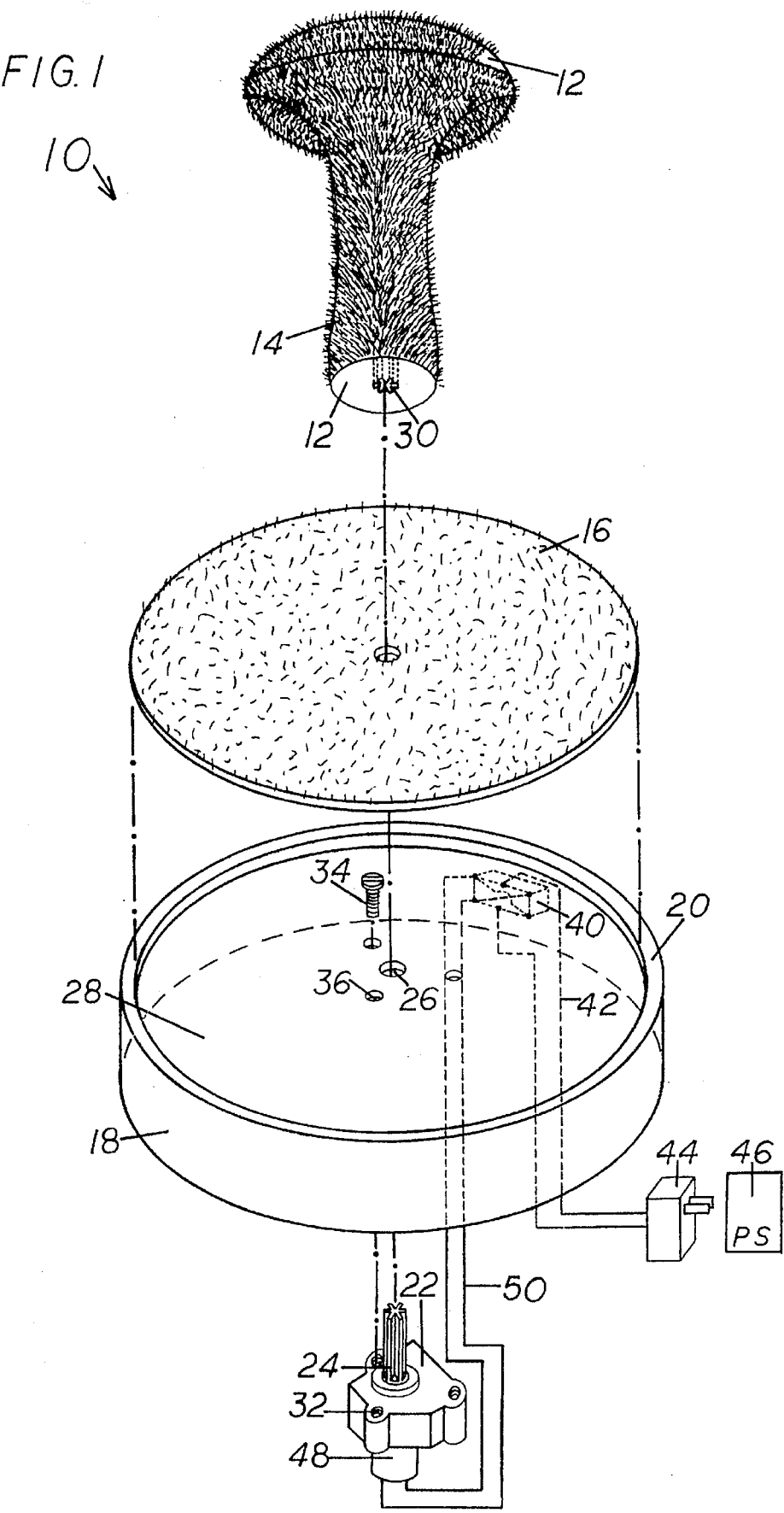

MECHANICALLY ASSISTED ANIMAL SELF-GROOMING DEVICE

This application is a continuation-in-part of Ser. No. 08/348,728, filed Dec. 2, 1994 now U.S. Pat. No. 5,540,186.

FIELD OF THE INVENTION

The present invention relates to mechanically assisted or motorized animal self-grooming devices, and more particularly to an improved mechanically assisted animal self-grooming device that is inexpensive and simple in construction.

BACKGROUND—DISCUSSION OF THE PRIOR ART

The most closely related prior art devices of record are U.S Pat. No. 2,721,538, by Latham, Oct. 25, 1955, disclosing "An Animal Operated Power Brush Grooming Device." Latham's device shows considerable complexity and expense of construction, wherein malfunctions to one or more component parts may often occur costing the consumer an additional financial burden. Latham's device will also require periodic lubrication maintenance. U.S. Pat. No. 3,175,537, by Paul, Mar. 30, 1965, discloses an "Apparatus for Grooming and Applying Insecticide to an Animal." Paul's device has to be mounted to a vertical wall or member. This device exhibits the same complexity as Latham's device. Pat. No. FR 2643-220-A, by Dufraisse, 08/1990 discloses an "Automatic Cattle Brush" suspended from a large frame and operated by a motor. The frame has to be anchored securely to the floor or ground. This device is expensive and requires a good deal of space. Pat. No. SU 1540-747-A by Wosa, 02/1990, discloses a "Reindeer Shedding Wool Picking Plant." This device is not motorized and has considerable length requirements.

SUMMARY OF THE INVENTION

Current statistics reveal that there are about 63 million domesticated cats in the U.S. at the present time. With the current economy requiring two incomes to support a higher standard of living, more couples find that their animals are left at home unattended for longer periods of time. Most families more or less live with the problem of animal hair since there are no really effective devices available on the market to solve the problem. The first problem is the constant evidence of animal hair throughout the home. The second problem is that certain parts of the upholstered furniture become rubbing posts, leaving accumulations of hair as well as the dirt from the animal's body. While many pet cats are strictly confined to the house, there are many pet cats permitted to go outdoors. This outdoor freedom only adds additional dirt to the body hair which is carried into the home environment. There are also many stationary self-grooming devices, wherein the animal has to provide all of the motions or efforts to utilize the devices as they were intended. Most animals will remain appreciative for extended periods of time when brushes are moved against their bodies by the human hand. The object of the present invention is to provide mechanical movement to a brush; to simulate the brushing movements of the human hand over an animal's body. The present invention effectively fulfills, or solves a long felt need by protecting the home environment that never before was addressed or implemented by the prior art of record. Generally, the improved present invention is comprised of a housing forming a circular base. A vertically oriented peripheral sidewall extends from its lower edge to an upper surface supported by the peripheral sidewall. A compact, maintenance-free, miniature electric motor assembly is affixed to the underside of the upper-surface and is concealed within the base. The miniature motor assembly splined output shaft extends upwards through an opening in and above the upper surface area. A brush or rubbing medium is directly coupled in-line to the vertical output shaft, thereby eliminating costly and unnecessary complexity of design. The unique brush or rubbing medium is circular and increases in diameter at its uppermost portion, whereby the brush will resemble the shape of a mushroom. A transformer or converter provides low voltage from a standard power source to operate the motor. A double-pole, double-throw switch is employed for reversing motor rotation when desired. A carpet affixed to the top flat surface area of the base is provided as a gripping surface for an animal when using the grooming brush. The carpet also serves in importance for containing loose animal hair, debris, and dander, dropped from the animal or grooming brush to the immediate surface area of the device, thereby preventing its spread throughout the living environment. The single mushroom shaped brush easily permits grooming the top and side surfaces of an animal's coat simultaneously, whereby only one brush is required for efficient grooming. Testing of this applicant's working prototype, with the brush automatically reversing rotation, interfered with the animal's grooming efforts. Applicant observed the animal's various grooming positions to exceed ten minutes per position in many cases. Automatic brush reversal interfered with the animal's contented brushing. The animal was also frequently observed with the rotating brush grooming against the grain of its coat. It was found preferrable to manually reverse the motor rotation via the switch every so often instead. It was also found desirable to let the brush operate continuously throughout the day, thereby negating the use of luring aids such as catnip, spring mounted toys, accessory sounds, or automatic starting devices. The barely audible hum of the motor and rotating brush produced more than enough lure incentive for the animal.

It is therefore an object and advantage of the present invention to provide an improved animal device that significantly improves the human living environment of animal owners, by reducing the amount of hair, dander, dirt, and other airborne pollutants, carried by domestic animals that are also associated with human allergies.

Another object of the invention is to provide an improved device that will serve as a substitute rubbing medium to protect furniture or other areas of the home.

Another object of the invention is to provide mechanical movement to a brush that would simulate the brushing movements of the human hand.

Another object of the invention is that the device effectively entices an animal to spend more productive time with the moving brush of the device for more complete removal of loose hair and debris from its body.

Another object of the invention is to contain loose hair and debris to the brush and carpeted surface of the device, thereby preventing its spread throughout the home environment.

Another object of the invention is that the device can operate continuously, economically, and safely, for the animal and home owner, through a low voltage power source.

Another object of the invention is that the device motor assembly has substantial torque for effective grooming when directly coupled to the brush, and the brush can be stalled by the human hand with no adverse affects to the motor assembly.

Another object of the invention is that the device requires only one size to effectively accommodate almost all domesticated cats.

Another object of the invention is that the low voltage wiring is harmless to an animal if chewed upon.

Another object of the invention is that the miniature motor assembly requires no maintenance.

Another object of the invention is that the addition of luring aids such as catnip, spring mounted toys, accessory sounds, automatic starting, are not required for the device.

Another object of the invention is that the device is made affordable to all domesticated cat owners.

Another object of the invention is that the mushroom shaped brush easily permits grooming the top and side surfaces of the animal's coat simultaneously, whereby only one brush is necessary.

Another object of the invention is that the miniature electric motor may be powered by low voltage direct current or low voltage alternating current.

BRIEF DESCRIPTION OF THE DRAWINGS

FIG. 1 is an exploded view in perspective showing a mushroom shaped grooming brush, carpeting, a circular base, a miniature motor assembly, motor reversing switch, and related wiring.

COMPLETE DESCRIPTION OF THE INVENTION

FIG. 1 shows an exploded view in perspective of a mechanically assisted animal self-grooming device assembly 10 comprising a mushroom shaped brush or rubbing medium body 12 covered with projecting bristles 14. The mushroom shaped brush easily permits grooming the top and side surfaces of an animal's coat simultaneously. The device assembly 10 includes a carpet 16 for paw gripping, claw scratching, and containing loose animal hair and dander dropped from the grooming brush, thereby preventing its spread throughout the home environment. The device of assembly 10 further includes a housing forming a circular base having a vertical oriented peripheral sidewall 18 extending from its lower edge to an upper surface 28 supported by sidewall 18, and a raised ridge 20 around upper surface 28 that serves as a border or finish edge for carpeting 16 affixed to upper surface 28. The miniature motor assembly 22 has a splined output shaft 24 that passes through an opening 26 of upper surface 28 of base sidewall 18 and is directly coupled with the recessed splined opening 30 of the mushroom shaped body 12. Motor assembly 22 is provided with a plurality of threaded ears 32 that fasten to the underside of top surface 28 of base sidewall 18 by threaded screws 34 that pass through openings 36 in upper surface 28 of base sidewall 18. A slideable, manual double-pole, double-throw motor reversing switch 40, shown in hidden lines, is mounted to the inside vertical side of base sidewall 18. The motor reversing switch 40 receives low voltage power from wiring 42 via transformer/converter plug 44 that mates to a typical 115 volt A/C wall receptacle power'source 46. The slideable front portion (not shown) of motor reversing switch 40 has a clockwise, counterclockwise, and off position setting for motor 48 of electric motor assembly 22 via wiring 50 from motor reversing switch 40. Applicant's animal self-grooming working prototype device employs a miniature motor assembly rated at 24 volts D.C. producing 26 rpm. Applicant uses a plug-in converter rated at 12 volt D.C. output, thereby causing the motor assembly to produce a predetermined rate of 13 rpm. Other preselected rates of reasonable revolutions may also be used. The motor assembly output shaft provides substantial torque and can be stalled repeatedly by a closed hand without any adverse affects to the motor or heavy duty geartrain. The object of the present invention is to provide a rugged device with long term reliability, and with the most simplistic approach to its component design, so as to make it easily affordable to the millions of pet owners concerned about their pets and their home environment. Cats have an inherent instinct for rubbing their bodies against objects moreso than any other animal, and since cats are of a more uniform weight and size when adults, only one device size would be necessary, thereby holding costs of manufacture at a minimum. While the above descriptions may contain many specific details, these should not be construed as limitations on the scope of the invention. For example, other embodiments, additions, or modifications may be used, such as combining the present invention within an enclosure or condo for pets designed for other purposes; adding a ball and track; varying the rpm of the brush; or employing motors with different voltage inputs; and providing different sizes and motor requirements for dogs.

Thus it has been shown that the mechanically assisted animal self-grooming device can perform all of the objectives as outlined above. Examples of embodiments or modifications are herein detailed in accordance with the descriptive requirements of law. It should be understood that the details are to be interpreted as illustrative and not in a limiting sense.

I claim:

1. A mechanically assisted animal self-grooming device comprising:
   a) a housing forming a base and having a vertically oriented peripheral sidewall and an upper surface supported by said peripheral sidewall;
   b) a shaft extending through said upper surface of said housing;
   c) means for rotating said shaft disposed within said housing, said rotating means causing said shaft to rotate at a preselected rate of revolution;
   d) rubbing means directly coupled to said shaft and disposed above said upper surface of said housing, said rubbing means being of a substantially upstanding mushroom shape of grooming the back and side of an animal simultaneously.

2. The device of claim 1, wherein said housing is circular in cross-section.

3. The device of claim 1, wherein said means for rotating said shaft comprises an electric motor assembly.

4. The device of claim 1, wherein said rubbing means comprises a brush having a rigid body directly coupled to said shaft and a plurality of bristles extending outwardly from said rigid body.

5. The device of claim 1, further comprising a reversing switch connected to said means for rotating said shaft such that the direction of rotation of said shaft may be selectively reversed.

6. The device of claim 1, wherein said upper surface of said housing includes means for permitting an animal to sink its claws therein and thus function as a scratching pad for an animal.

* * * * *